(12) United States Patent
Riley

(10) Patent No.: US 10,630,483 B2
(45) Date of Patent: Apr. 21, 2020

(54) ANONYMOUS IMAGE/VIDEO DIGITAL SIGNATURE INSERTION AND AUTHENTICATION

(71) Applicant: Legitipix, LLC, Portland, OR (US)

(72) Inventor: Sean Patrick Riley, Portland, OR (US)

(73) Assignee: Legitipix, LLC, Portland, OR (US)

( * ) Notice: Subject to any disclaimer, the term of this patent is extended or adjusted under 35 U.S.C. 154(b) by 114 days.

(21) Appl. No.: 15/791,140

(22) Filed: Oct. 23, 2017

(65) Prior Publication Data

US 2019/0123910 A1    Apr. 25, 2019

(51) Int. Cl.
*H04L 29/00* (2006.01)
*H04L 9/32* (2006.01)
(Continued)

(52) U.S. Cl.
CPC ............ *H04L 9/3247* (2013.01); *G06F 21/16* (2013.01); *G06F 21/31* (2013.01); *G06F 21/36* (2013.01); *G06T 1/0042* (2013.01); *H04L 9/0643* (2013.01); *H04L 9/0877* (2013.01); *H04L 9/0897* (2013.01); *H04L 9/3234* (2013.01); *H04L 9/3236* (2013.01);
(Continued)

(58) Field of Classification Search
CPC ... H04L 9/0643; H04L 9/0877; H04L 9/0897; H04L 9/3234; H04L 9/3236; H04L 9/3247; H04L 63/126; H04W 12/06; H04W 12/02; H04W 12/12; G06T 1/0042; G06F 21/31; G06F 21/36; G06F 21/16
See application file for complete search history.

(56) References Cited

U.S. PATENT DOCUMENTS 5,499,294 A    3/1996  Friedman
5,898,779 A    4/1999  Squilla et al.
(Continued)

FOREIGN PATENT DOCUMENTS

| JP | 2016103775 A | 6/2016 |
| WO | 0049797 | 8/2000 |
| WO | 2016147066 A1 | 9/2016 |

OTHER PUBLICATIONS

Ping Wah Wong et al., "Secret and public key authentication watermarking schemes that resist vector quantization attack", Security and Watermarking of Multimedia Contents II, May 9, 2000, Proceedings vol. 3971, 11 pages.
(Continued)

*Primary Examiner* — Don G Zhao
(74) *Attorney, Agent, or Firm* — Schwabe, Williamson & Wyatt, P.C.

(57) ABSTRACT

Embodiments herein relate to an electronic device that includes a camera sensor to capture a digital image that includes a plurality of pixels. The electronic device may further include a digital signature calculation engine coupled with the camera sensor, the digital signature calculation engine to generate, based on a private key that is shared between a plurality of image/video acquisition modules and a pixel of the plurality of pixels, a digital signature. The electronic device may further include digital signature insertion logic coupled with the digital signature calculation engine, the digital signature insertion logic to insert an indication of the digital signature into the digital image. Other embodiments may be described and/or claimed.

16 Claims, 11 Drawing Sheets

(51) Int. Cl.
*G06T 1/00* (2006.01)
*H04W 12/02* (2009.01)
*H04W 12/12* (2009.01)
*G06F 21/31* (2013.01)
*H04W 12/06* (2009.01)
*G06F 21/16* (2013.01)
*G06F 21/36* (2013.01)
*H04L 9/06* (2006.01)
*H04L 9/08* (2006.01)

(52) U.S. Cl.
CPC .......... *H04W 12/02* (2013.01); *H04W 12/06* (2013.01); *H04W 12/12* (2013.01)

(56) References Cited

U.S. PATENT DOCUMENTS

| | | |
|---|---|---|
| 6,269,446 B1 | 7/2001 | Schumacher et al. |
| 6,351,223 B1 | 2/2002 | DeWeerd et al. |
| 6,658,135 B1 | 12/2003 | Morito et al. |
| 7,075,571 B1 | 7/2006 | Nakajima et al. |
| 7,093,299 B1 | 8/2006 | Kamijo et al. |
| 7,216,232 B1 | 5/2007 | Cox et al. |
| 7,231,133 B2 | 6/2007 | Kasai |
| 7,953,982 B2 | 5/2011 | Walmsley |
| 8,020,002 B2 | 9/2011 | Lapstun et al. |
| 8,027,468 B2 | 9/2011 | McCloskey |
| 8,055,014 B2 | 11/2011 | Ellingson |
| 8,175,322 B2 | 5/2012 | Tian et al. |
| 8,280,098 B2 | 10/2012 | Yadid-Pecht et al. |
| 8,457,346 B2 | 6/2013 | Rodriguez et al. |
| 8,473,757 B2 | 6/2013 | Gladstone et al. |
| 8,505,104 B2 | 8/2013 | Lee et al. |
| 8,738,917 B2 | 5/2014 | Wakao et al. |
| 9,083,867 B2 | 7/2015 | Alfarano et al. |
| 9,088,733 B2 | 7/2015 | Van Natter |
| 9,582,843 B2 | 2/2017 | Leonard et al. |
| 2002/0060736 A1 | 5/2002 | Wakao et al. |
| 2002/0093573 A1 | 7/2002 | Cromer et al. |
| 2002/0191091 A1 | 12/2002 | Raynor |
| 2003/0126432 A1 | 7/2003 | Tonisson |
| 2004/0201751 A1 | 10/2004 | Bell et al. |
| 2005/0081041 A1* | 4/2005 | Hwang .................. H04L 9/088 713/176 |
| 2005/0262350 A1 | 11/2005 | Boutant et al. |
| 2006/0036864 A1 | 2/2006 | Parulski et al. |
| 2006/0047966 A1 | 3/2006 | Iwamura |
| 2006/0072144 A1* | 4/2006 | Dowling .............. G06F 21/606 358/1.15 |
| 2007/0271592 A1* | 11/2007 | Noda .................. G06F 21/6218 726/1 |
| 2008/0028235 A1* | 1/2008 | Smith .................. G06F 21/575 713/190 |
| 2008/0301815 A1* | 12/2008 | Lauter .................. G03G 21/04 726/26 |
| 2012/0019640 A1 | 1/2012 | Choudury |
| 2012/0095922 A1 | 4/2012 | Wada |
| 2013/0031037 A1 | 1/2013 | Brandt et al. |
| 2013/0191631 A1* | 7/2013 | Ylonen .............. H04L 63/1483 713/153 |
| 2014/0049653 A1* | 2/2014 | Leonard ................ G06T 1/0042 348/207.1 |
| 2014/0314235 A1 | 10/2014 | Matischek |
| 2015/0103383 A1* | 4/2015 | Dowling ........... H04N 1/00225 358/402 |
| 2016/0335779 A1 | 11/2016 | Satish et al. |
| 2017/0041328 A1 | 2/2017 | Stack et al. |
| 2017/0126646 A1* | 5/2017 | Zhou .................... H04L 63/062 |
| 2017/0286311 A1 | 10/2017 | Juenemann et al. |
| 2018/0096340 A1* | 4/2018 | Omojola ................ G06Q 20/10 |
| 2018/0212782 A1* | 7/2018 | Csik ........................ G06F 21/32 |
| 2019/0123911 A1* | 4/2019 | Riley .................... H04L 9/0643 |

OTHER PUBLICATIONS

Assa Naveh et al., "PhotoProof: Cryptographic Image Authentication for Any Set of Permissible Transformations", 2016 IEEE Symposium on Security and Privacy, (2016), 17 pages.

United States Patent Office; Non-Final Office Action issued for U.S. Appl. No. 16/162,760 dated Feb. 20, 2019; 35 pages.

\* cited by examiner

ANONYMOUS IMAGE/VIDEO DIGITAL SIGNATURE INSERTION AND AUTHENTICATION

FIELD

Embodiments of the present disclosure generally relate to image authentication and, more specifically, to anonymous image authentication using a digital signature.

BACKGROUND

Image authentication may be useful when trying to identify whether an image has been tampered with in some way. However, in legacy systems, image authentication may be difficult to perform securely. For example, some image authentication techniques may be spoofed or otherwise altered such that an image may be identified as authentic when it is not. By contrast, if an image authentication service is secure, then in some cases the image authentication may only be performed by identifying the specific user that is requesting authentication or the user that generated the image itself. Therefore, it may not be possible for a user to generate or authenticate an image while remaining anonymous.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
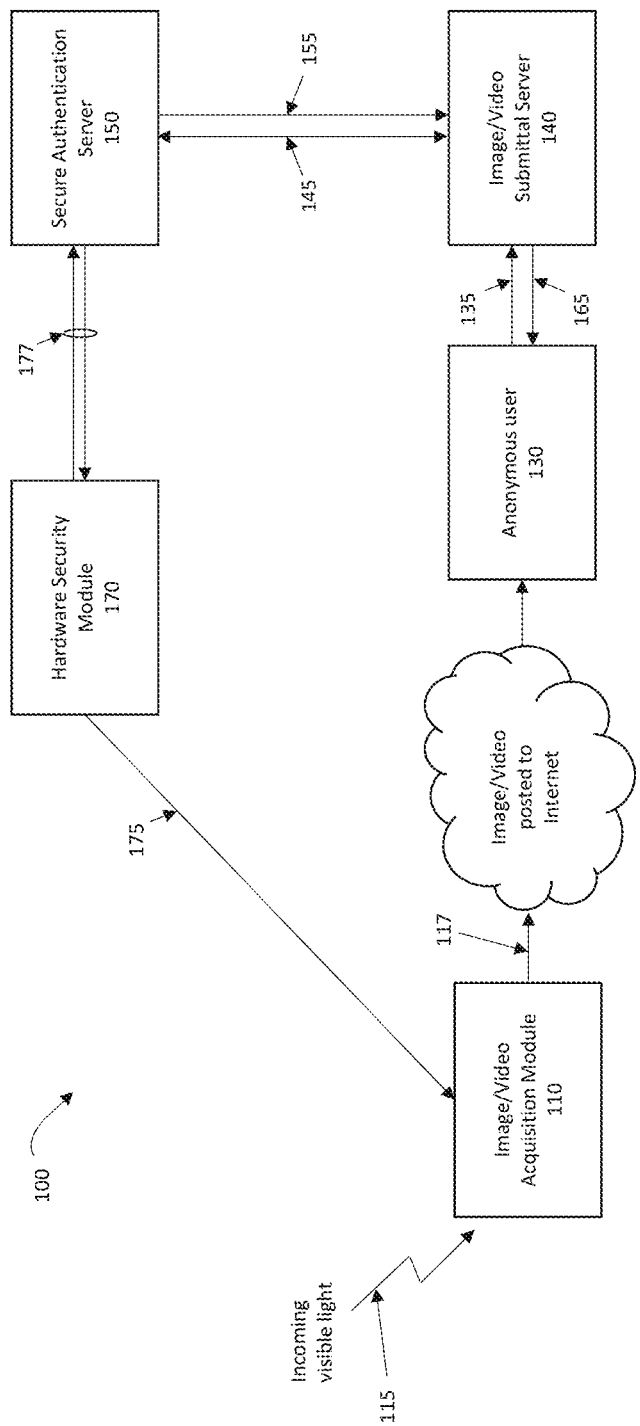
FIG. 1 depicts an example system architecture in accordance with various embodiments.

Embodiments herein may relate to the creation, insertion, and subsequent anonymous authentication of a digital signature into the red green blue (RGB) pixel data internal to, or very near to, a Complementary Metal Oxide Semiconductor (CMOS) sensor of a camera such as one that may be used in a smartphone, a video camera, or some other type of camera. The creation, insertion, or authentication may be performed by an element of the camera which may be referred to as an image/video acquisition module. In embodiments, the image/video acquisition module may be a stand-alone integrated circuit that is coupled with the CMOS sensor. In other embodiments, the image/video acquisition module may be an element of the CMOS sensor.

The inserted digital signature may later be recovered in such a way that both the individual who captured the image/video and the individual seeking to authenticate the image/video may remain anonymous. Generally, embodiments herein may allow authentication that the image has not been modified since its original capture, while retaining the privacy of the person and device that generated the original image or video.

Generally, the authentication technique may start with the generation of a unique digital signature for a given image. For the purpose of descriptions of embodiments herein, video may be treated like a sequential thread of independent images created by the CMOS sensor. As used herein, the term "image" may refer to a single independent image, or a plurality of images that are encoded either temporally or spatially as part of a chronological video stream. Generally, as described in greater detail below, the digital signature may be unique to the image it represents. However, the digital signature may not be unique to a specific image/video acquisition module, or an individual user of a device. Therefore, the image may be verified to be authentic, yet allow the individual who captured the image and the individual who verifies the image to remain anonymous.

Generally, the authentication may use Public Key Infrastructure (PKI) techniques with additional elements relating to the generation, provisioning, and management of the private and public keys themselves. This digital signature may be used to provide authentication that the image or video has not been modified since its original capture by a CMOS sensor, but may not be used to identify an individual image/video acquisition module or user of same.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 depicts an example system architecture in accordance with various embodiments. More specifically, an example of the overall system 100 for image/video digital signature calculation, insertion, and subsequent anonymous authentication is shown in FIG. 1.

The system 100 may include an image/video acquisition module 110 that may be used to capture incoming light 115 and convert it to a digital image or plurality of images making up a video. A digital signature may be calculated and inserted in the image/video before the image/video is converted to one of a variety of formats and anonymously sent to the Internet or some other shared file service 117. An anonymous user 130 may download the image/video and forward it via the Internet or other shared file service 135 to the image/video submittal server 140 with a request for authentication. The image/video submittal server 140 may perform operations to recover the inserted digital signature and calculate a separate digital signature directly from the image itself. The digital signature or the separate digital signature may be forwarded in a secure fashion 145 to the secure authentication server 150. The secure authentication server 150 may perform calculations to verify the recovered digital signature matches the calculated digital signature and that the public key used in the digital signature is on the list of known good public keys. The result of these calculations (or some indication thereof) may be sent in a secure fashion 155 back to the image/video submittal server 140. The image/video submittal server 140 may generate an appropriate message, and may forward, at 165, that message (or an indication thereof) to the anonymous user who originally requested authentication.

In some embodiments, the list of known good public keys may be created by the secure authentication server 150 via secure communication 177 from one or more hardware security modules (HSMs) 170 that may be co-located at the place of manufacture of the image/video acquisition modules 110. The HSM 170 may create private/public key pairs for provisioning or insertion 175 into the image/video acquisition modules 110. The secure authentication server 150 may authorize the HSMs 170 to create private/public key pairs in an ongoing fashion via a secure communications channel 177.

Figure 2:
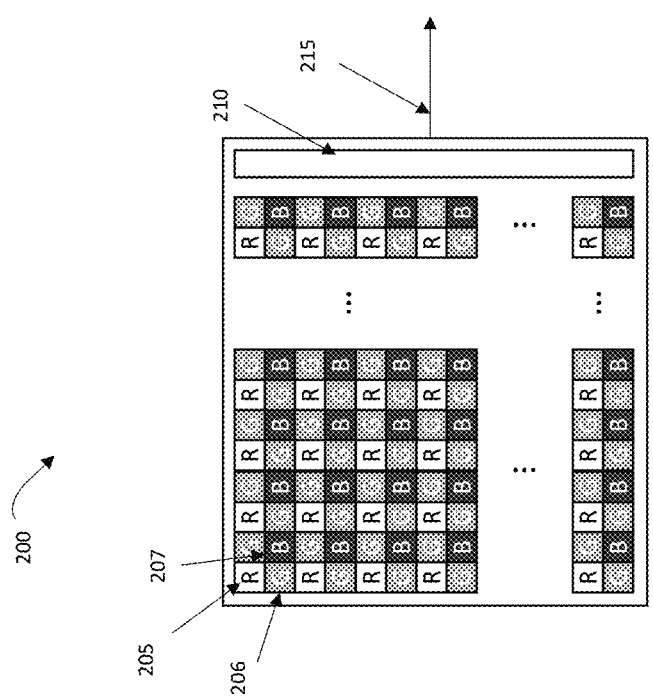
FIG. 2 depicts an example complementary-metal-oxide semiconductor (CMOS) sensor in accordance with various embodiments.

The image/video acquisition module 110 may capture the image or video and convert it to a digital format for transmission or storage. In most cases, the image/video acquisition module 110 may generate an image or video with a CMOS sensor 200. Generally, a CMOS sensor 200 may be an integrated circuit of light-sensitive cells arranged in a regular, two-dimensional, rectangular array. An example is shown in FIG. 2. Specifically, FIG. 2 depicts an example CMOS sensor in accordance with various embodiments.

This two-dimensional array may be a discrete number of cells high and wide. The total number of cells is the product of the height and width and may be referred to as the resolution of the CMOS sensor. The array typically may have three kinds of cells which are each sensitive to a different spectrum of light. In embodiments, these arrays may have cells that sense the intensity of red, green or blue light and are therefore referred to as red cells 205, green cells 206, or blue cells 207. The red cells 205, green cells 206, and blue cells 207 may be arranged in a variety of different configurations, but one example configuration may be a pattern that has twice as many green cells as red or blue cells. This arrangement may be used because the human eye is generally more sensitive to the color green. When the appropriate signal is asserted, the CMOS sensor 200 may measure the light intensity values of each cell and may start streaming these values out of the device one row of cells at a time. These light intensity values are initially analog voltage levels and may be converted to digital values by an analog-to-digital converter located in the CMOS sensor 200. The digital representation of the light intensity captured by each cell may be referred to as a pixel and may be 8, 10, or 12 bits in depth. An 8 bit sensor may distinguish between 256 levels of light intensity whereas a 12 bit CMOS sensor may distinguish between 4096 levels of light intensity. Once the values are converted to pixels, they may be arranged for transmission in the digital pixel data streaming module 210 and communicated out of the CMOS sensor 200 via a digital pixel data streaming interface 215.

Because each discrete cell in the CMOS sensor 200 array may only detect one of the three red, green, or blue colors, the raw image that comes out of the sensor may resemble a checkerboard of these three colors. Post-processing is typically employed to fill in the missing information for each color. There are many different ways to create the full image from the partial image, but the most common approaches may involve some kind of interpolation based on a pixel's nearest neighbors. When this process is complete, the captured image may be represented by three different red, green and blue images. This format is sometimes referred to as RGB.

Figure 3:
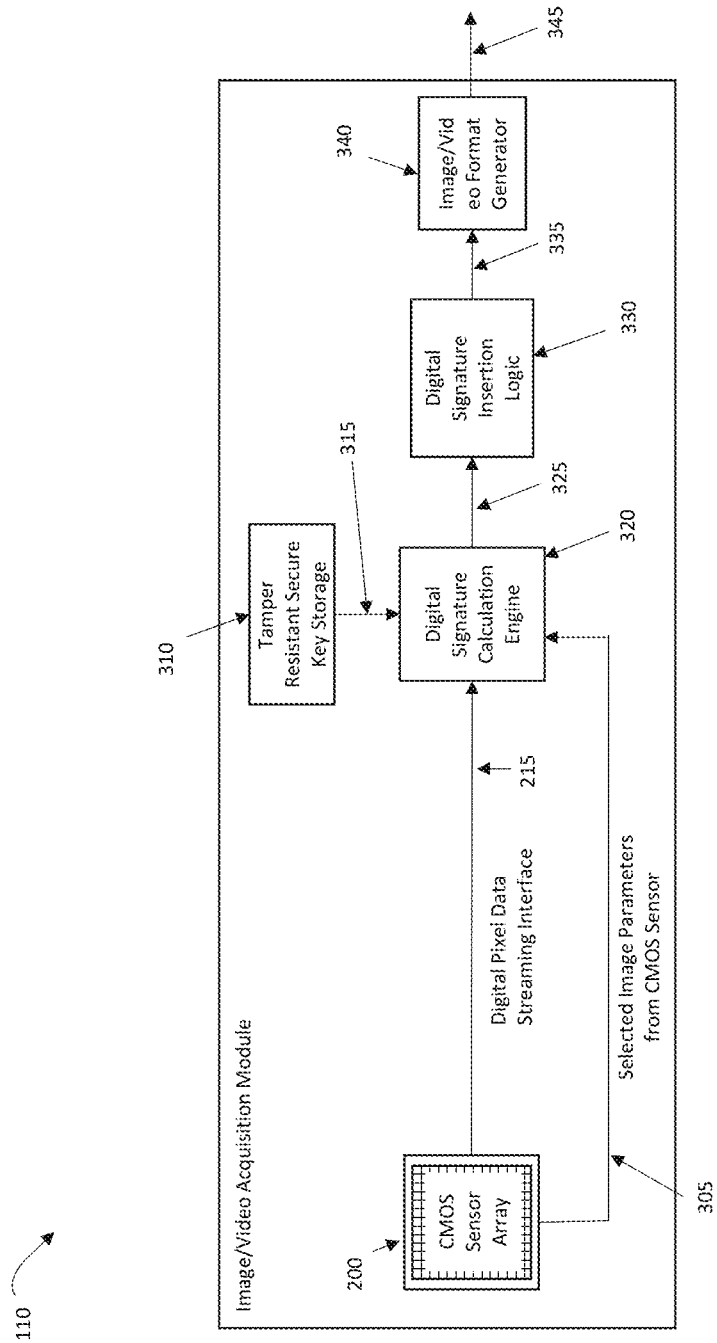
FIG. 3 depicts an example image/video acquisition module, in accordance with some embodiments.

The image/video acquisition module 110 may include a variety of elements including the CMOS sensor 200, a tamper resistant secure key storage 310, a digital signature calculation engine 320, a digital signature insertion logic 330, and the image/video format generator 340 as shown in FIG. 3. Specifically, FIG. 3 depicts an example image/video acquisition module, in accordance with some embodiments.

An image may be captured by the CMOS sensor 200 and forwarded via the digital pixel data streaming interface 215 to the digital signature calculation engine 320. The digital signature may be created by the digital signature calculation engine 320 and may be based, for example, on an internal hashing function and a key stored in tamper resistant secure key storage 310. Tamper resistant secure key storage 310 may refer to a special kind of memory function that may store private keys and other secure data in a way that makes it difficult for an unauthorized entity to read the keys or data with physical or electronic methods. In some cases the digital signature calculation engine 320 and the tamper resistant key storage 310 may reside on the same tamper resistant integrated circuit. In embodiments, the internal hashing function may operate on a horizontal row of pixel data at a time. Any number of rows of pixels may be processed through this internal hashing function. The output of the internal hashing function may be a fixed bit-length, exclusive representation of the pixel data that has gone through the internal hashing function. No matter how many pixels are input into the internal hashing function, the calculated hash value will always be the same fixed bit length. This internal hashing function may be combined with a private key/public key pair to create a digital signature of the chosen pixel values according to digital signature algorithms popular in the domain. The process for the initial selection and provisioning of the private/public key pair is discussed in greater detail below.

The digital signature calculation engine 320 may operate on any combination of the red, green and blue pixels. For instance, the digital signature calculation engine 320 may choose to only process the green pixels. In addition, the digital signature calculation engine 320 may consider only the most relevant bits of each multi-bit pixel value. These bits might be the most significant bits of digital pixel values and therefore represent the image without the finer details. These bits might be chosen to maximize the probability that the authentication comparison will still be valid after image information loss due to scaling and/or compression.

After the digital signature is calculated, the digital signature calculation engine 320 may forward the digital signature to the digital signature insertion logic 330 via a dedicated interface 325. The digital signature insertion logic 330 may insert the digital signature into the image/video. The image/video may be forwarded to the image/video format generator 340 via an internal interface 335. The image/video format generator 340 may modify the image/video with the inserted digital signature into the desired final image/video format and may store the image and/or forward it out of the image/video acquisition module 110 vis the external interface 345.

Figure 4:
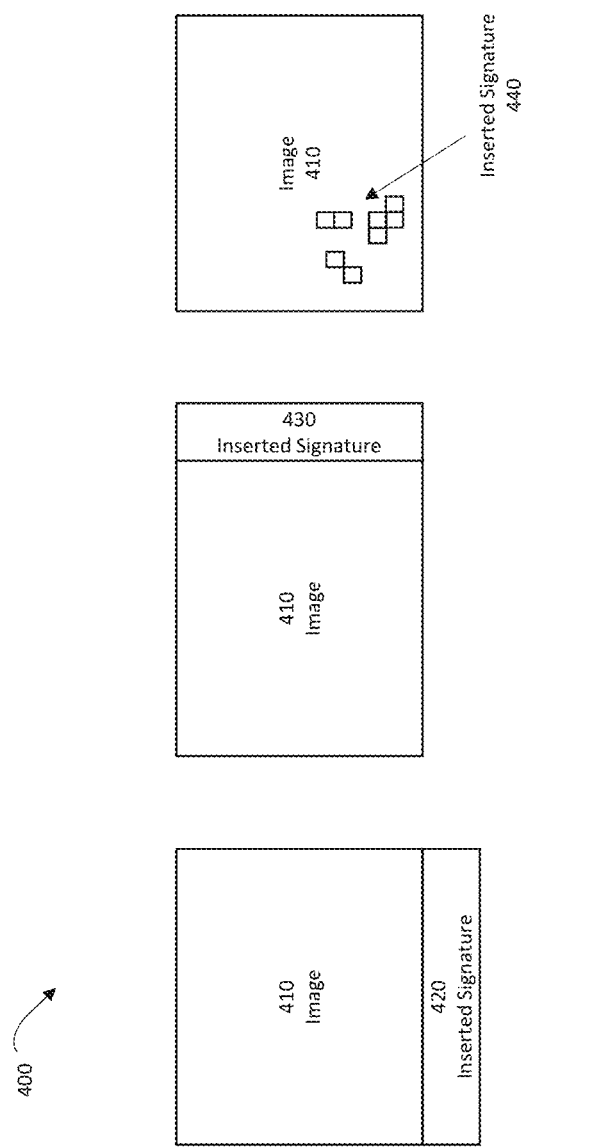
FIG. 4 depicts example implementations of a digital signature insertion into an image/video, in accordance with some embodiments.

The digital signature may be, for example, a specific set or sequence of ones and zeros, and may be inserted into the image as a part of the image itself in the form of additional pixel data. This insertion may be performed in a variety of ways, three of which are shown in FIG. 4. Specifically, FIG. 4 depicts example implementations of a digital signature insertion into an image/video, in accordance with some embodiments. It will be recognized that these examples are intended only as illustrative, and other embodiments may utilize different techniques or processes by which the digital signature may be inserted into an image/video.

In the diagram 400, the digital image 410 may initially be the same number of discrete pixels high (Y direction) and wide (X direction). In one embodiment, the digital signature insertion logic 330 may insert or append the digital signature at the bottom of the image 420, either replacing the bottom-most pixel values of the image or extending the Y (height) dimension of the image. In one embodiment, the digital signature insertion logic 330 may insert or append the digital signature at the far right of the image 430, either replacing the far right pixel values of the image or extending the X (width) dimension of the image. In one embodiment, the digital signature insertion logic 330 may take the digital signature bits and embed them in the image pixel values themselves 440. This may be done in a way that does not affect, or does not materially affect, a human being's perception of the image.

In the case of digital signature insertion at the far right or at the bottom of the image, some embodiments may insert full 8×8 blocks of 64 pixels. Doing so may provide two advantages. First, follow-on processing such as Joint Photographic Experts Group (JPEG) encoding or Moving Picture Experts Group (MPEG) encoding often operates on 8×8 pixel blocks. By inserting 8×8 blocks, the digital signature insertion engine may select patterns that could survive some level of JPEG or MPEG quantization and compression. Since an 8×8 pixel block contains 64 pixel values of 8 to 12 bits each, the inserted 8×8 pixel blocks may each represent a certain number of digital signature bits with a high degree of redundancy and error correction. This redundancy or error correction may further allow the digital signature to be recovered even after the image has been through a reasonable level of scaling and/or compression.

It may be advantageous to insert a series of 8×8 pixel blocks that represent the digital signature purely in one of the red, green or blue colors. It may also be required to change some of the fundamental properties of the captured image, such as the image height, image width and the total pixel count. In this case, the digital signature insertion logic 330 may intercept and replace these parameters as they are sent from the CMOS sensor 200 over the appropriate control interface 305.

It will be understood that the description of the digital signature as an 8×8 block of pixels is intended as only one example of such a digital signature. In other embodiments, the digital signature may be a block such as a 10×10 block or some other size of block. In some embodiments the digital signature may be an asymmetric block of pixels that may include one or more rows and one or more columns (e.g., a single row of 64 pixels, or some other type of block).

Most CMOS sensors 200 do not have extra physical space on the integrated circuit to include a large amount of additional logic and memory. The choice of design for the tamper resistant secure key storage 310, digital signature calculation engine 320 and the digital signature insertion logic 330 may contemplate an implementation in a very small area and with low power consumption to allow potential integration into the CMOS sensor 200 integrated circuit.

Once the digital signature has been inserted by the digital signature insertion logic 330, the image/video may be analyzed for purposes of authentication. In order to describe this process, it may be important to understand the procedure for originally generating and provisioning the private/public key pair in the image/video acquisition module 110.

Public Key Infrastructure (PKI) is typically used to provide the necessary encryption for the digital signature mechanism. PKI is built upon the concept of a private/public key pair that are mathematically related. If a message is encrypted with a given public key, only the corresponding private key may be used to decrypt the message. Similarly, if a digital signature is created with a private key, only the corresponding public key may be used to confirm that the digital signature is authentic.

The private/public key pair may be generated and provisioned by a secure manufacturing processes involving a hardware security module (HSM) 170. The HSM 170 may be a separate entity that physically resides in the manufacturing location for the image/video acquisition module 110. The HSM 170 may establish secure communications 177 with the integrated circuits that make up the image/video acquisition module during their manufacture—specifically the integrated circuits that contain the tamper resistant secure key storage 310. This may be the CMOS sensor 200 itself, or another companion integrated circuit that resides on the same printed circuit board as the CMOS sensor 200. The HSM 170 may work in tandem with tamper resistant secure key storage 310 within the image/video acquisition module 110 to securely insert a private key into tamper resistant secure key storage 310. The tamper resistant secure key storage 310 may be implemented by a semiconductor manufacturer in such a way as to prevent external parties from obtaining the contents of the storage by electronic or physical means.

Figure 5:
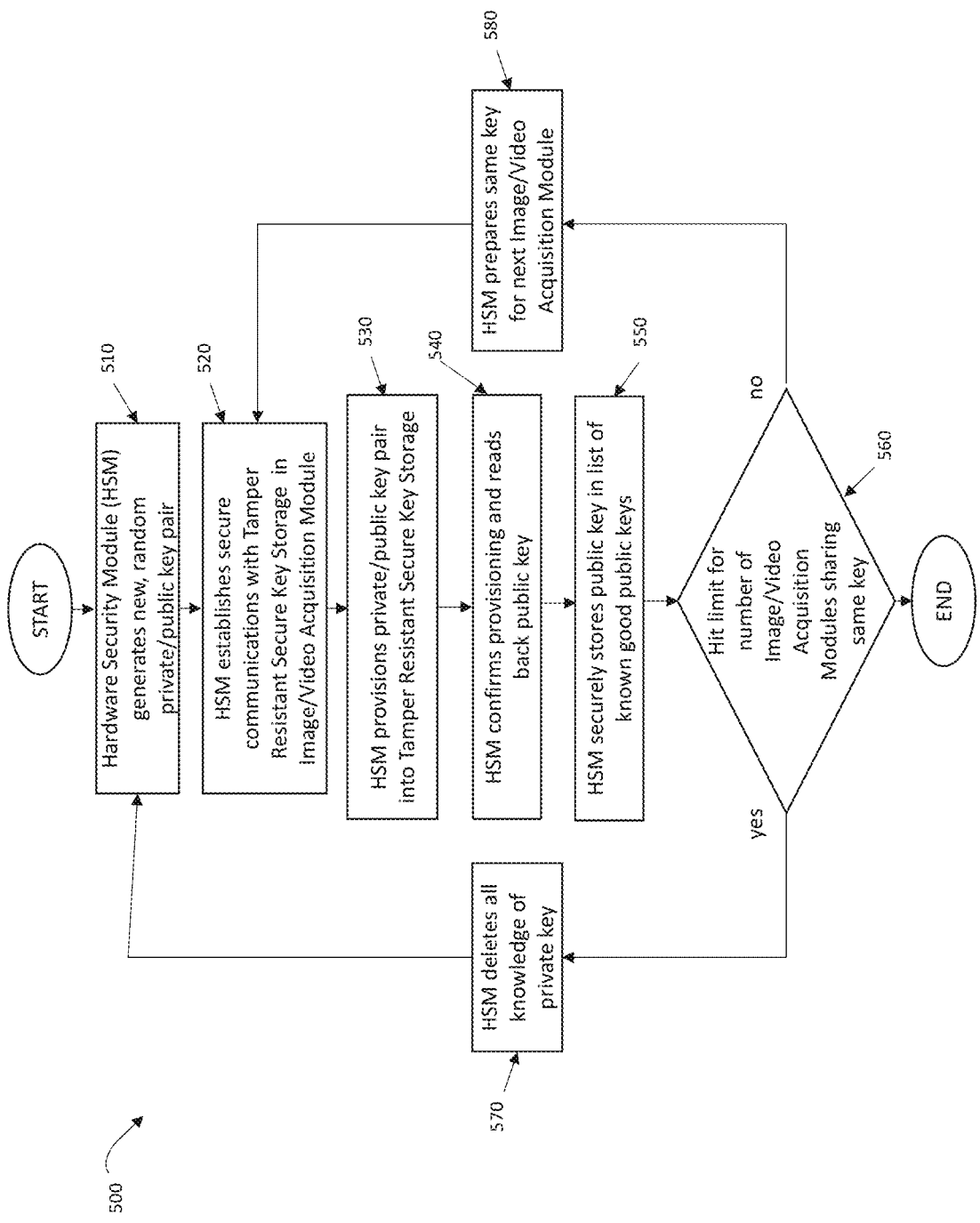
FIG. 5 depicts an example technique related to securing keys into an image/video acquisition module, in accordance with various embodiments.

FIG. 5 depicts an example technique related to securing keys into an image/video acquisition module, in accordance with various embodiments. More specifically, FIG. 5 illustrates an example flow diagram for a technique 500 for key provisioning between the HSM 170 and the tamper resistant secure key storage 310 located within an image/video acquisition module 110. At block 510, the technique 500 may include the generation of a new, random private/public key pair by the HSM 170. At block 520, the technique 500 may include the HSM 170 establishing a secure communication channel with the tamper resistant secure key storage 310 in the image/video acquisition module 110. At block 530, the technique 500 may include the HSM 170 securely provisioning the private key and public key into the tamper resistant secure key storage 310. At block 540, the technique 500 may include the secure read-back of the public portion of the key by the HSM 170 in order to confirm correct provisioning. At block 550, the technique 500 may include the secure storage of the public key in the list of know good public keys within the HSM 170 for purposes of later transmitting to the secure authentication server 150. At block 560, the technique 500 may include the HSM 170 deciding, on its configuration, if it has reached the limit of the number of image/video acquisition modules 110 that share the same key pair. If so, block 570 of technique 500 may include the HSM 170 deleting the private key information within the HSM 170 and returning to the start of technique 500 at block 510 to generate a new private/public key pair within the HSM 170. If not, block 580 of technique 500 may begin again with the HSM 170 using the same key pair and another image/video acquisition module 110, returning to block 520 of technique 500.

The public portion of the PKI key pair may be recorded by the HSM 170 and shared over a secure two-way communication channel 177 at the request of the secure authentication server 150. The private portion of the PKI key pair may not be shared outside the HSM 170 or image/video acquisition module 110. If the HSM 170 is involved in generating the private key portion of the PKI key pair, it may not retain this information after the private key has been provisioned into the required number of image/video acquisition modules 110. The HSM 170 may retain the public portion of the PKI key pair and securely communicate this information to the secure authentication server 150 in a pre-defined way over a secure two-way communication channel 177. Keeping track of valid public keys in the secure authentication server 150 may help prevent a malicious third party from generating its own private/public key pair and using it to insert a valid digital signature into a known invalid image.

In order to ensure the privacy of the individual user of any given image/video acquisition module 110, the HSM 170 may insert the same private key into a large number of image/video acquisition modules 110. This means that several modules may share the same private key and, hence, the same public key. This unique approach may allow the secure authentication server 150 to identify legitimate public keys, yet prevent an individual image/video acquisition module 110 from being identified. This anonymity may increase the usefulness of the overall system.

Figure 6:
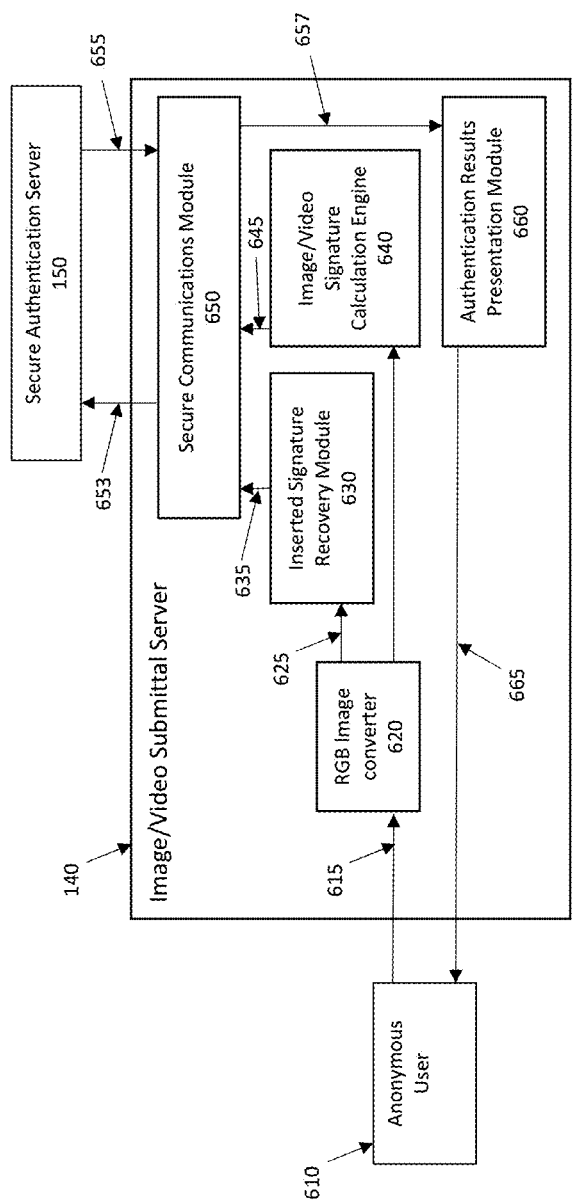
FIG. 6 depicts an example image/video submittal server, in accordance with various embodiments.

FIG. 6 depicts an example image/video submittal server, in accordance with various embodiments. Specifically, the image/video submittal server 140 shown in FIG. 6 contains the necessary modules to recover the inserted digital signature, compute a digital signature for the image itself and communicate with the anonymous user 610 and the secure authentication server 150. An anonymous user 610 may submit an image or video to the image/video submittal server 140 via the Internet or other shared file service 615. After an image/video is submitted for authentication to the image/video submittal server 140, the image may be converted from JPEG, MPEG or another format to RGB by the RGB image converter 620 and forwarded over an internal interface 625. The inserted signature recovery module 630 may then extract the inserted digital signature from the RGB image. This may be accomplished by performing an algorithm approximating the reverse of the digital signature algorithm that was used to insert the signature into the image/video. The recovered digital signature and the recovered public key used for that particular image/video may be determined and forwarded 635 to the secure communications module 650. However, it is not yet known if the public key is on the known good public key list and therefore authorized to created authentic digital signatures. The image/video signature calculation engine 640 then may process the image pixel values themselves and directly calculate the image/video's hash value. This calculated hash value may also be forwarded 645 to the secure communications module 650. The secure communications module 650 may establish a secure communications channel 653 with the secure authentication server 150 and forward the information it received from the inserted signature recovery module 630 and the image/video signature calculation engine 640. Later, the secure authentication server 150 may respond to the secure communications module 650 via another secure communications channel 655. The information may then be forwarded to the authentication results presentation module 660 via an internal interface 657. The authentication results presentation module 660 may respond to the anonymous user 610 who originally submitted the image via the Internet or shared file service 665.

Figure 7:
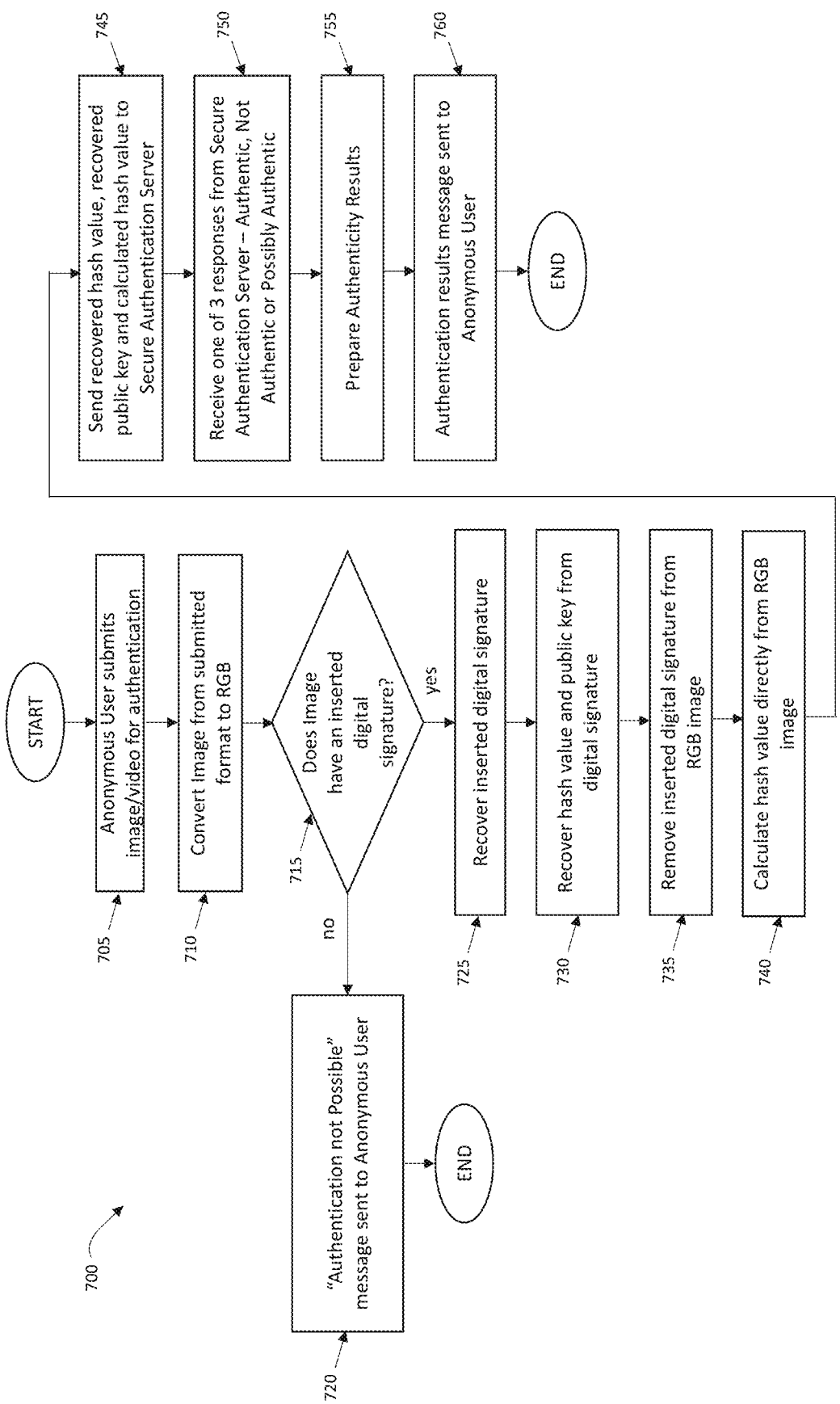
FIG. 7 depicts an example technique related to authentication of an image/video, in accordance with some embodiments.

FIG. 7 depicts an example technique related to authentication of an image/video, in accordance with some embodiments. Specifically, FIG. 7 illustrates an example flow diagram for a technique 700 used by the image/video submittal server 140 related to the submission of image/video content, processing of said content, and the communication of the result of that processing to the anonymous user 610 who submitted the image/video content. At block 705, the technique 700 may include the submission of image or video content by the anonymous user 130 to the image/video submittal server 140. At block 710, the technique 700 may include a conversion from the submitted format to RGB format by the RGB image converter 620. At block 715, the technique 700 may have the inserted signature recovery module 630 determine if the submitted image/video content contains an inserted digital signature. If not, technique 700 may move to block 720 and may have the inserted signature recovery module 630 generate an "authentication not possible" message. If so, technique 700 may move to block 725 where the inserted digital signature may be recovered by the inserted signature recovery module 630. Block 730 of technique 700 may have the inserted signature recovery module 630 recover the hash value and public key from the recovered digital signature. Block 735 of technique 700 may have the image/video signature calculation engine 640 strip the digital signature from the image/video, leaving only the original image/video. Block 740 of technique 700 may have the image/video signature calculation engine 640 calculate the hash value directly from the original image/video. Block 745 of technique 700 may have the secure communications module 650 send the recovered and calculated information to the secure authentication server 150. Block 750 of technique 700 may collect an authentication response from the secure authentication server 150. Block 755 of technique 700 may have the authentication results presentation module 660 combine the authentication response with other messages intended for the anonymous user 610 who submitted the image/video for authentication. Block 760 of technique 700 may have the authentication results presentation module 660 send this response to the anonymous user 610.

Figure 8:
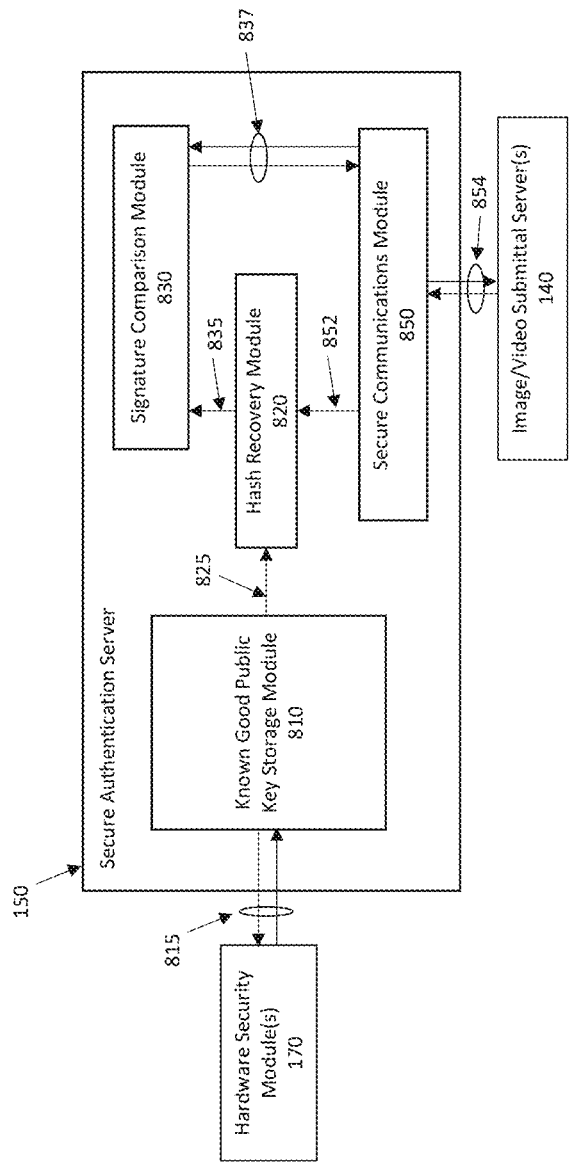
FIG. 8 depicts an example of a block diagram of a secure authentication server, in accordance with various embodiments.

The secure authentication server 150 may be made up of several modules, shown in FIG. 8. Specifically, FIG. 8 depicts an example of a block diagram of a secure authentication server, in accordance with various embodiments.

The modules of the secure authentication server 150 may include the known good public key storage module 810, the hash recovery module 820, the signature comparison module 830 and the secure communications module 850. The secure authentication server 150 may keep a list of known good public keys in the known good public key storage module 810. The secure authentication server 150 may have built and maintained this list over time by securely communicating 815 with the various HSMs 170 deployed into image/video acquisition module 110 manufacturing facilities. The secure authentication server 150 may not know any of the private keys, as these may be known only to the tamper resistant secure key storage 310 within each image/video acquisition module 110 and possibly an HSM 170. The hash recovery module 820 may obtain the hash value and public key from the recovered digital signature it receives from the secure communications module 850 over internal interface 852. The hash recovery module 820 may communicate with the known good public key storage module 810 over an internal interface 825 to compare the recovered public key to the list of known good public keys. The signature comparison module 830 may compare the recovered signature to the calculated signature it receives from the image/video submittal server 140 via the secure communications module 850 over internal interface 837. The secure communications module 850 may be similar to the secure communications module in the image/video submittal server 140 and may ensure secure communication between the secure authentication server 150 and the image/video submittal server 140 over interface 854.

Since all comparisons may be done inside the secure authentication server 150, there may not be a need to send the list of valid public keys outside of the secure authentication server 150. Because the amount of data that should be communicated outside the secure authentication server 150 is small relative to the size of the image/video, this approach may efficiently use network bandwidth.

The secure authentication server 150 also may serve the function of continually checking and authorizing the HSMs 170 that are co-located in various manufacturing sites for image/video acquisition modules 110. In embodiments, the HSMs 170 may be implemented as physically secure pieces of equipment with strong tamper detection and prevention features. If an HSM 170 is physically compromised, then it may immediately delete all resident cryptographic information and the secure authentication server 150 may not be able to confirm authentication. If a public key is ever known to be compromised, then the secure authentication server 150 may remove it from its list of known good public keys and take remediation.

Figure 9:
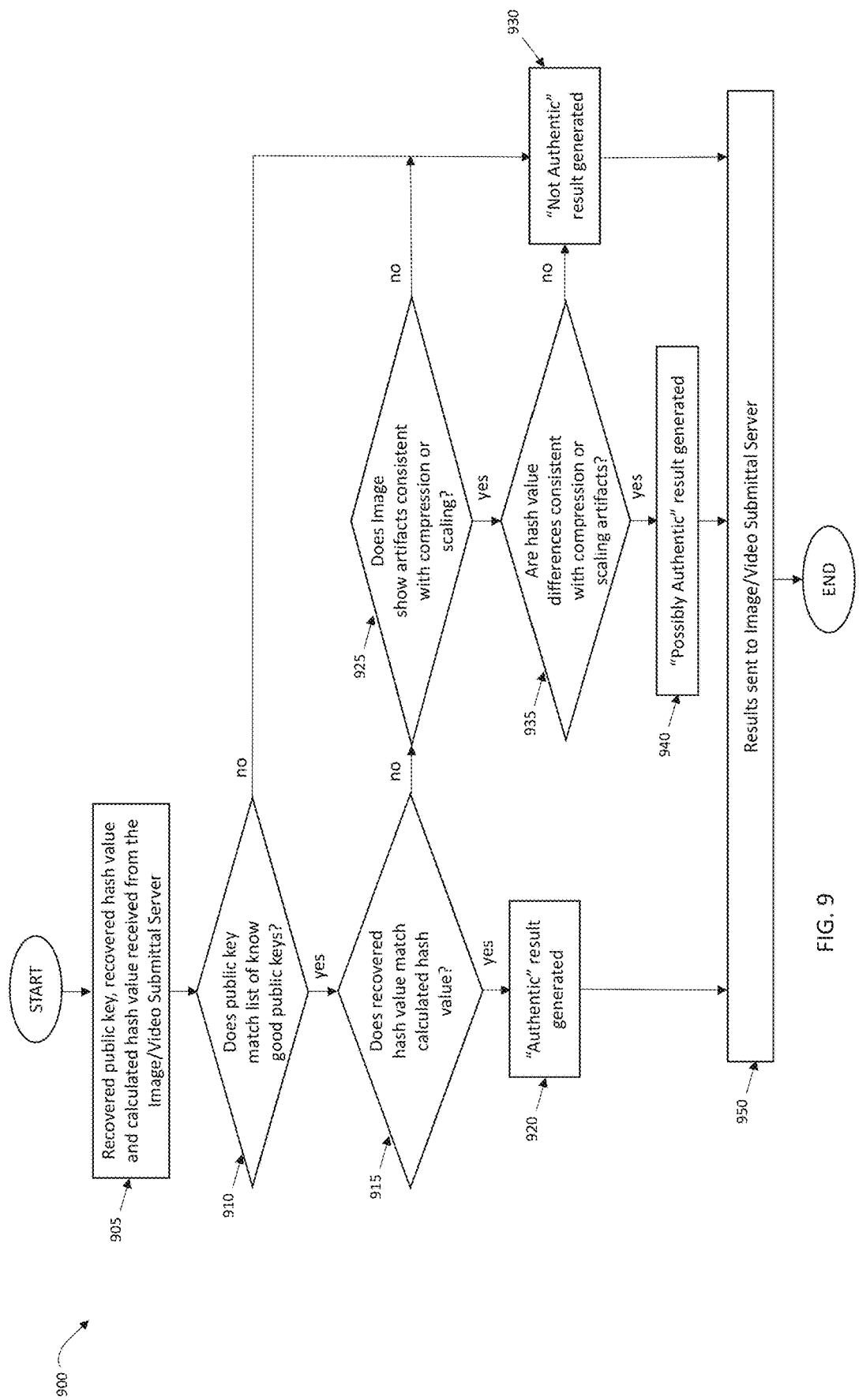
FIG. 9 depicts an example technique related to processing and authentication of information received from an image/video submittal server, in accordance with some embodiments.

FIG. 9 depicts an example technique related to processing and authentication of information received from an image/video submittal server 140, in accordance with some embodiments. FIG. 9 illustrates an example flow diagram for a technique 900 of determining the authenticity of an image by analyzing the recovered hash value, recovered public key and calculated hash value.

At block 905, technique 900 may receive the recovered hash value, recovered public key and calculated hash value from the image/video submittal server 140 via the secure communication module 850. At block 910, the technique 900 may have the known good public key storage module 810 determine if the recovered public key matches the list of known good public keys. If no, technique 900 continues to block 930 where a "not authentic" response may be generated by the secure communication module 850. If yes, technique 900 continues on to block 915 where signature comparison module 830 may determine if the recovered hash value is an exact match for the calculated hash value. If yes, technique 900 continues to block 920 where an "authentic" response may be generated by the secure communications module 850. If no, technique 900 moves to block 925 where the calculated hash value and the recovered hash value may be analyzed by the signature comparison module 830 to determine if the image/video may have once been authentic, but may have been image processed via scaling, compression of other non-malicious techniques. If this is determined to be a possibility, technique 900 moves to block 935 where the hash values differences are examined. If it may be determined that it is likely the image is authentic but has been overly scaled and/or compressed since its origination, then technique 900 moves to block 940 and a "possibly authentic" response may be generated by the signature comparison module 830. If the preceding statement is determined to be unlikely by the signature comparison module 830, technique 900 may move to block 930 and a "not authentic" response may be generated by the signature comparison module 830. Technique 900 culminates in block 950 where one of three generated messages—authentic, not authentic or possibly authentic—may be communicated by the secure communications module 850 back to image/video submittal server 140.

Figure 10:
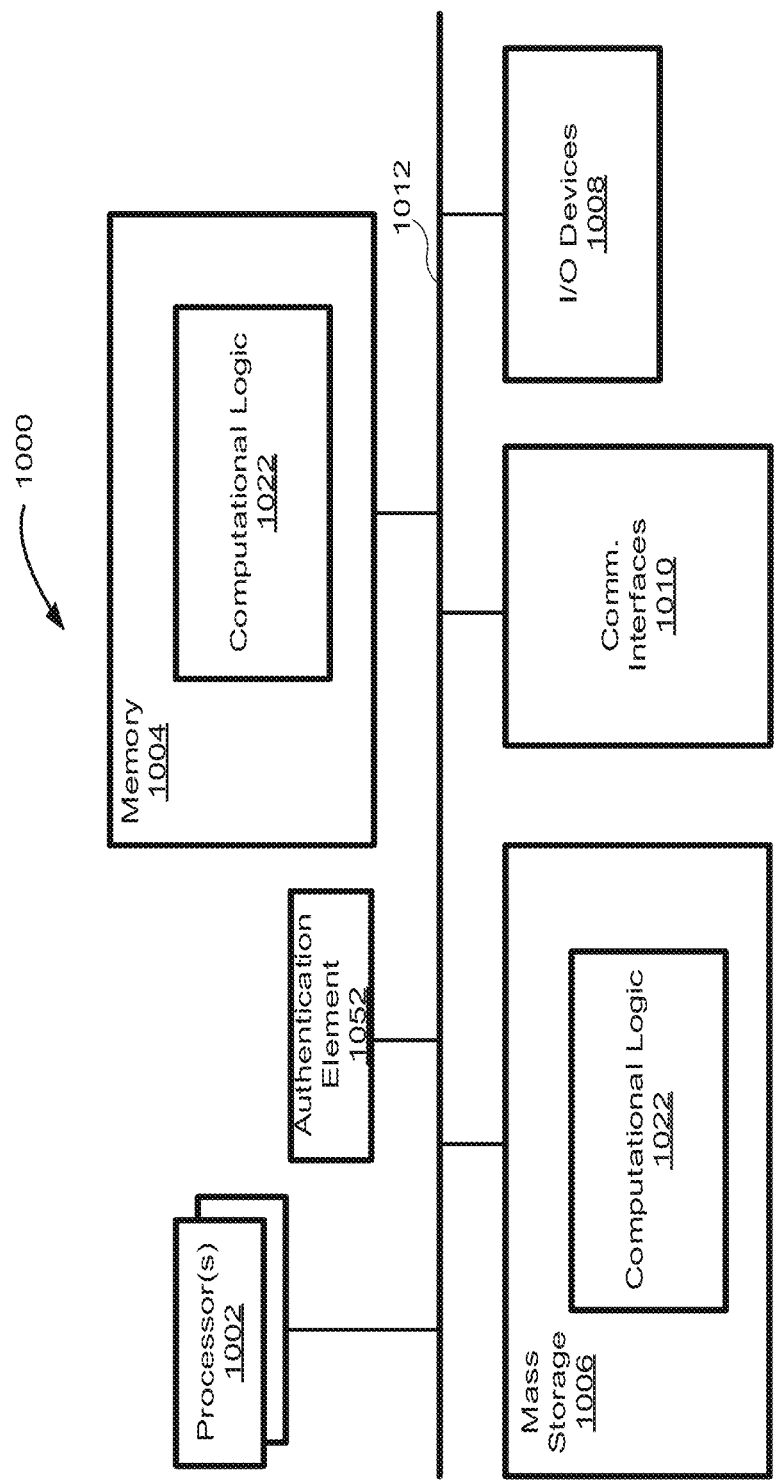
FIG. 10 illustrates a block diagram of an example computing device, in accordance with various embodiments.

FIG. 10 illustrates a block diagram of an example computing device 1000 suitable for use with various components or techniques of Figures herein, in accordance with various embodiments. For example, the computing device 1000 may be, or may include or otherwise be coupled to, image/video acquisition module 110, image/video submittal server 140, secure authentication server 150, hardware security module 170, or components, elements, or combinations thereof. As shown, computing device 1000 may include one or more processors or processor cores 1002 and system memory

1004. For the purpose of this application, including the claims, the terms "processor" and "processor cores" may be considered synonymous, unless the context clearly requires otherwise. The processor 1002 may include any type of processors, such as a central processing unit (CPU), a microprocessor, and the like. The processor 1002 may be implemented as an integrated circuit having multi-cores, e.g., a multi-core microprocessor. The computing device 1000 may include mass storage devices 1006 (such as diskette, hard drive, non-volatile memory (e.g., compact disc read-only memory (CD-ROM), digital versatile disk (DVD), and so forth). In general, system memory 1004 and/or mass storage devices 1006 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth.

The computing device 1000 may further include I/O devices 1008 (such as a display (e.g., a touchscreen display), keyboard, cursor control, remote control, gaming controller, image capture device, and so forth) and communication interfaces 1010 (such as network interface cards, modems, infrared receivers, radio receivers (e.g., Bluetooth), and so forth).

The communication interfaces 1010 may include communication chips (not shown) that may be configured to operate the device 1000 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), Evolved UTRAN (E-UTRAN), or some other wireless protocol. The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1010 may operate in accordance with other wireless protocols in other embodiments. In various embodiments, computing device 1000 may include an authentication element 1052 that may be, for example, the image/video acquisition module 110, image/video submittal server 140, secure authentication server 150, hardware security module 170, or components, elements, or combinations thereof described with respect to FIG. 1. In some embodiments, the authentication element 1052 may be coupled with other components of the computing device 1000.

The above-described computing device 1000 elements may be coupled to each other via system bus 1012, which may represent one or more buses. In the case of multiple buses, they may be bridged by one or more bus bridges (not shown). Each of these elements may perform its conventional functions known in the art. In particular, system memory 1004 and mass storage devices 1006 may be employed to store a working copy and a permanent copy of the programming instructions for the operation of various components of computing device 1000, including but not limited to an operating system of computing device 1000 and/or one or more applications. The various elements may be implemented by assembler instructions supported by processor(s) 1002 or high-level languages that may be compiled into such instructions.

The permanent copy of the programming instructions may be placed into mass storage devices 1006 in the factory, or in the field through, for example, a distribution medium (not shown), such as a compact disc (CD), or through communication interface 1010 (from a distribution server (not shown)). That is, one or more distribution media having an implementation of the agent program may be employed to distribute the agent and to program various computing devices.

The number, capability, and/or capacity of the elements 1008, 1010, 1012, and 1052 may vary, depending on whether computing device 1000 is used as a stationary computing device, such as a set-top box or desktop computer, or a mobile computing device, such as a tablet computing device, laptop computer, game console, or smartphone.

In embodiments, memory 1004 may include computational logic 1022 configured to implement various firmware and/or software services associated with operations of the computing device 1000. For some embodiments, at least one of processors 1002 may be packaged together with computational logic 1022 configured to practice aspects of embodiments described herein to form a System in Package (SiP) or a System on Chip (SoC).

In various implementations, the computing device 1000 may comprise one or more components of a data center, a laptop, a netbook, a notebook, an ultrabook, a smartphone, a tablet, a personal digital assistant (PDA), an ultra mobile PC, a mobile phone, or a digital camera. In some embodiments, the computing device 1000 may include one or more components of an interne of things (IoT) device. In further implementations, the computing device 1000 may be any other electronic device that processes data.

Figure 11:
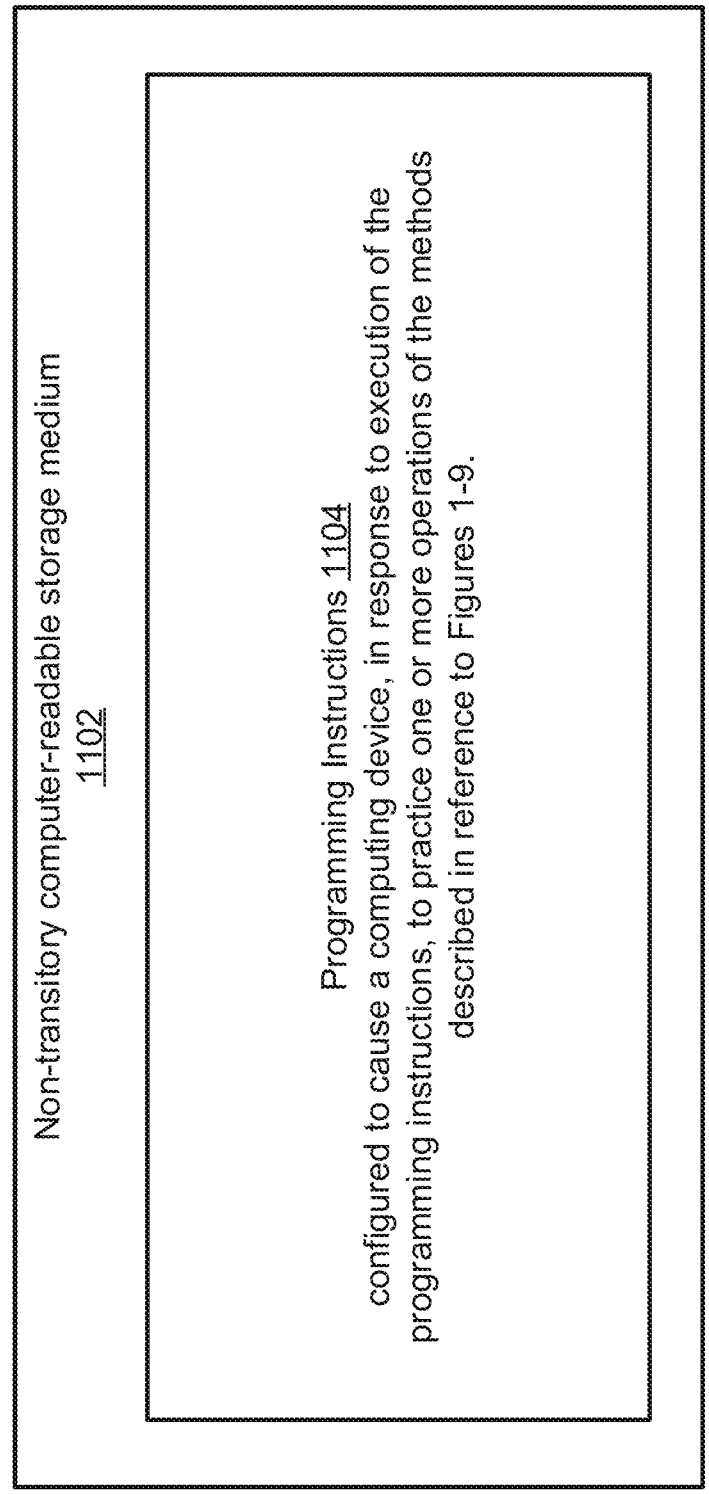
FIG. 11 illustrates example computer-readable storage medium, in accordance with various embodiments

FIG. 11 illustrates example computer-readable storage medium 1102 having instructions configured to practice all or selected ones of the operations associated with the computing device 1000 earlier described with respect to FIG. 10 or other elements or techniques described herein in FIGS. 1-9, in accordance with various embodiments. As illustrated, computer-readable storage medium 1102 may include a number of programming instructions 1104. The storage medium 1102 may represent a broad range of non-transitory persistent storage media known in the art, including but not limited to flash memory, dynamic random access memory, static random access memory, an optical disk, a magnetic disk, etc. Programming instructions 1104 may be configured to enable a device, e.g., computing device 1000, authentication element 1052 that may be, for example, the image/video acquisition module 110, image/video submittal server 140, secure authentication server 150, hardware security module 170, etc., in response to execution of the programming instructions 1104, to perform, e.g., but not limited to, various operations described herein and particularly with respect to FIG. 5, 7, or 9. In alternate embodiments, programming instructions 1104 may be disposed on multiple computer-readable storage media 1102. In alternate embodiments, storage medium 1102 may be transitory, e.g., signals encoded with programming instructions 1104.

Referring back to FIG. 10, for an embodiment, at least one of processors 1002 may be packaged together with memory having all or portions of computational logic 1022 configured to practice aspects shown or described herein. For an embodiment, at least one of processors 1002 may be packaged together with memory having all or portions of computational logic 1022 configured to practice aspects shown or described herein to form a System in Package (SiP). For an embodiment, at least one of processors 1002 may be integrated on the same die with memory having all or portions of computational logic 1022 configured to practice aspects shown or described herein. For an embodiment, at least one of processors 1002 may be packaged together with memory having all or portions of computational logic 1022 configured to practice aspects shown or described herein to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques. Various non-limiting examples may include one or more of the following:

Example 1 may include an acquisition module comprising: a camera sensor to capture a digital image that includes a plurality of pixels; a digital signature calculation engine coupled with the camera sensor, the digital signature calculation engine to generate, based on a private key that is shared between a plurality of image/video acquisition modules and a pixel of the plurality of pixels, a digital signature; and digital signature insertion logic coupled with the digital signature calculation engine, the digital signature insertion logic to insert an indication of the digital signature into the digital image.

Example 2 may include the acquisition module of example 1, wherein the camera sensor is a complementary-metal-oxide semiconductor (CMOS) sensor.

Example 3 may include the acquisition module of example 1, wherein the digital image comprises a plurality of sequential images.

Example 4 may include the acquisition module of example 1, wherein the digital image is a red green blue (RGB) image.

Example 5 may include the acquisition module of any of examples 1-4, wherein the digital signature insertion logic is further to generate, based on the digital signature, the indication of the digital signature, and wherein the indication of the digital signature is a pixel block.

Example 6 may include the acquisition module of example 5, wherein the pixel block is an 8×8 pixel block.

Example 7 may include the acquisition module of example 5, wherein the pixel block is a single row that includes a plurality of pixels.

Example 8 may include the acquisition module of example 5, wherein the indication of the digital signature is appended to the digital image.

Example 9 may include the acquisition module of example 5, wherein the indication of the digital signature is embedded into the digital image.

Example 10 may include the acquisition module of any of examples 1-4, further comprising a tamper resistant secure key storage coupled with the digital signature calculation engine, the tamper resistant secure key storage to store the private key.

Example 11 may include the acquisition module of any of examples 1-4, wherein the acquisition module is an element of a digital camera.

Example 12 may include the acquisition module of any of examples 1-4, wherein the digital signature insertion logic is further to insert redundant digital signature bits and error correction codes into the digital image.

Example 13 may include the acquisition module of example 12, wherein the redundant digital signature bits and error correction codes are to allow a secure authentication server to decode the digital signature if the digital image is processed by scaling or compression.

Example 14 may include a hardware security module comprising: first circuitry to provision a private key to a first image/video acquisition module in a first device and a second image/video acquisition module in a second device; and second circuitry coupled with the first circuitry, the second circuitry to provide an indication of a public key that corresponds to the private key to a secure authentication server.

Example 15 may include the hardware security module of example 14, wherein the second circuitry is further to provide the indication of the public key to a list of known good public keys in the secure authentication server.

Example 16 may include the hardware security module of example 14, wherein the first circuitry is further to provision the public key to the first image/video acquisition module and the second image/video acquisition module.

Example 17 may include the hardware security module of any of examples 14-16, further comprising third circuitry coupled with the second circuitry, wherein the third circuitry is further to identify whether the private key has been provisioned to a number of image/video acquisition modules that is above a predefined limit and, if it identifies that the number is below the predefined limit, to direct the first circuitry to provision the private key to a third image/video acquisition module in a third device.

Example 18 may include the hardware security module of any of examples 14-16, wherein the first device or the second device are digital cameras.

Example 19 may include the hardware security module of any of examples 14-16, wherein the public key or the private key are based on an authorization received by the hardware security module from a secure authentication server.

Example 20 may include an image/video submittal server comprising: an inserted signature recovery module to identify, in a digital image, a digital signature included with the digital image, wherein the digital signature was generated by an image/video acquisition module with a private key shared between a plurality of image/video acquisition modules; an image/video signature calculation engine to generate, based on the digital image, a generated hash output; and a secure communications module coupled with the inserted signature recovery module and the image/video signature calculation engine, the secure communications module to forward the generated hash output and the digital signature to a secure authentication server.

Example 21 may include the image/video submittal server of example 20, wherein the secure communications module is further to receive an authentication result from the secure authentication server.

Example 22 may include the image/video submittal server of example 21, wherein the authentication result is an indication that the digital image is authentic, an indication that the digital image is not authentic, or an indication that the digital image is possibly authentic.

Example 23 may include the image/video submittal server of example 21, further comprising an authentication results presentation module coupled with the secure communications module, the authentication results presentation module to transmit an indication of the authentication result to a user that submitted the digital image.

Example 24 may include a secure authentication server comprising: a secure communications module to receive, from an image/video submittal server, a generated hash output and a digital signature related to a digital image, wherein the digital signature was generated by an image/video acquisition module with a private key shared between a plurality of image/video acquisition modules; a hash recovery module coupled with the secure communications module, the hash recovery module to identify based on the digital signature, a recovered hash output related to the private key and an indication of a public key that corresponds to the private key; and a signature comparison module coupled with the hash recovery module and the secure communications module, the signature comparison module to identify, based on a comparison of the recovered hash output and the generated hash output, an authentication result of the digital image.

Example 25 may include the secure authentication server of example 24, further comprising a public key storage module coupled with the hash recovery module, the public key storage module to provide an indication of a provided public key to the hash recovery module.

Example 26 may include the secure authentication server of example 25, wherein the hash recovery module is to identify, based on a comparison of the provided public key with the public key, whether the public key is valid.

Example 27 may include the secure authentication server of example 25, wherein the public key storage module is provisioned by a hardware security module that previously provided the private key to the image/video acquisition module.

Example 28 may include the secure authentication server of example 27, wherein the private key was generated by the hardware security module based on an indication transmitted from the secure authentication server.

Example 29 may include the secure authentication server of any of examples 24-28, wherein the authentication result is an indication that the digital image is authentic, an indication that the digital image is not authentic, or an indication that the digital image is possibly authentic.

Example 30 may include the secure authentication server of any of examples 24-28, wherein the secure communications module is further to provide an indication of the authentication result to the image/video submittal server.

Example 31 may include one or more non-transitory computer readable media comprising instructions that, upon execution of the instructions by one or more processors of a computing device, are to cause the computing device to perform, in whole or in part, one or more of the techniques, processes, or methods described in or related to any of examples 1-30.

Example 32 may include an apparatus comprising means to perform, in whole or in part, one or more of the techniques, processes, or methods described in or related to any of examples 1-30.

Example 33 may include a method comprising, in whole or in part, one or more of the techniques, processes, or methods described in or related to any of examples 1-30.

Other embodiments may be described and/or claimed.

What is claimed is:

1. A secure authentication server (SAS) comprising:
    processor circuitry communicatively coupled with communication interface circuitry, and wherein:
    the processor circuitry is arranged to operate secure communications logic to receive, from an image/video submittal server via the communication interface circuitry, a digital signature extracted from a digital image and a generated hash output calculated from pixel values of the digital image, wherein the digital signature was generated by an image/video acquisition device (IVAD) using a private key that corresponds to a public key, wherein the private key is shared among a plurality of IVADs;
    the processor circuitry is arranged to operate hash recovery logic to:
        recover a public key and a hash output from the digital signature, and
        identify an indication of whether the public key is included in a list of known public keys; and
    the processor circuitry is arranged to operate signature comparison logic to determine an authentication result for the digital image based on a comparison of the recovered hash output and the generated hash output and based on whether the public key is included in the list of known public keys.

2. The SAS of claim 1, further comprising public key storage circuitry coupled with the processor circuitry, the public key storage circuitry arranged to:
    store known public keys in the list of known public keys; and
    provide indications of the known public keys to the hash recovery logic operated by the processor circuitry.

3. The SAS of claim 2, wherein the public key storage circuitry is further arranged to:
    receive the known public keys from one or more hardware security elements (HSEs) via the communication interface circuitry, wherein the communication interface circuitry is communicatively coupled with the one or more HSEs over respective secure channels between the SAS and the one or more HSEs.

4. The SAS of claim 3, wherein the received known public keys are part of known public/private key pairs, and the private keys of the of the known public/private key pairs are stored in tamper resistant secure key storage in the image/video acquisition devices or the one or more HSEs.

5. The SAS of claim 3, wherein the processor circuitry is arranged to operate the signature comparison logic to:
    generate the authentication result to indicate that the digital image is authentic when the indicated public key is included in the list of known public keys and when the recovered hash output matches the generated hash output; and
    generate the authentication result to indicate that the digital image is possibly authentic when the indicated public key is included in the list of known public keys and when the recovered hash output has differences from the generated hash output that are consistent with compression artifacts or scaling artifacts included in the digital image.

6. The SAS of claim 5, wherein the processor circuitry is arranged to operate the signature comparison logic to:
    generate the authentication result to indicate that the digital image is not authentic when:
    the indicated public key is not included in the list of known public keys;
    the indicated public key is included in the list of known public keys, the recovered hash output does not match the generated hash output, and the digital image does not include the compression artifacts or the scaling artifacts; or
    the indicated public key is included in the list of known public keys, the recovered hash output does not match the generated hash output, the digital image includes artifacts consistent with compression or scaling of the digital image, and the differences between the recovered hash output and the generated hash output are not consistent with the compression artifacts or the scaling artifacts.

7. The SAS of claim 1, wherein the authentication result is an indication that the digital image is authentic, an indication that the digital image is not authentic, or an indication that the digital image is possibly authentic.

8. The SAS of claim 1, wherein the secure communications logic is further to provide an indication of the authentication result to the image/video submittal server via the communication interface circuitry.

9. One or more non-transitory computer-readable media (NTCRM) comprising instructions, wherein execution of the instructions by one or more processors of a secure authentication server (SAS) is to cause the SAS to:
receive, from an image/video submittal server, a digital signature extracted from a digital image and a generated hash output calculated from pixel values of the digital image, wherein the digital signature was generated by an image/video acquisition device (IVAD) using a private key that corresponds to a public key, and the private key is shared among a plurality of IVADs;
recover a public key and a hash output from the digital signature, and
identify an indication of whether the public key is included in a list of known public keys; and
determine an authentication result for the digital image based on a comparison of the recovered hash output and the generated hash output and based on whether the public key is included in the list of known public keys.

10. The one or more NTCRM of claim 9, wherein execution of the instructions is to cause the SAS to:
store known public keys in the list of known public keys; and
provide indications of the known public keys to the hash recovery logic operated by the processor circuitry.

11. The one or more NTCRM of claim 10, wherein execution of the instructions is to cause the SAS to:
receive the known public keys from one or more hardware security elements (HSEs), wherein the SAS is communicatively coupled with the one or more HSEs over respective secure channels between the SAS and the one or more HSEs.

12. The one or more NTCRM of claim 11, wherein the received known public keys are part of known public/private key pairs, and the private keys of the of the known public/private key pairs are stored in tamper resistant secure key storage in the IVADs or the one or more HSEs.

13. The one or more NTCRM of claim 11, wherein execution of the instructions is to cause the SAS to:
generate the authentication result to indicate that the digital image is authentic when the indicated public key is included in the list of known public keys and when the recovered hash output matches the generated hash output; and
generate the authentication result to indicate that the digital image is possibly authentic when the indicated public key is included in the list of known public keys and when the recovered hash output has differences from the generated hash output that are consistent with compression artifacts or scaling artifacts included in the digital image.

14. The one or more NTCRM of claim 13, wherein execution of the instructions is to cause the SAS to:
generate the authentication result to indicate that the digital image is not authentic when:
the indicated public key is not included in the list of known public keys;
the indicated public key is included in the list of known public keys, the recovered hash output does not match the generated hash output, and the digital image does not include the compression artifacts or the scaling artifacts; or
the indicated public key is included in the list of known public keys, the recovered hash output does not match the generated hash output, the digital image includes artifacts consistent with compression or scaling of the digital image, and the differences between the recovered hash output and the generated hash output are not consistent with the compression artifacts or the scaling artifacts.

15. The one or more NTCRM of claim 9, wherein the authentication result is an indication that the digital image is authentic, an indication that the digital image is not authentic, or an indication that the digital image is possibly authentic.

16. The one or more NTCRM of claim 9, wherein execution of the instructions is to cause the SAS to provide an indication of the authentication result to the image/video submittal server via the communication interface circuitry.

* * * * *

UNITED STATES PATENT AND TRADEMARK OFFICE
CERTIFICATE OF CORRECTION

PATENT NO. : 10,630,483 B2
APPLICATION NO. : 15/791140
DATED : April 21, 2020
INVENTOR(S) : Sean Patrick Riley Page 1 of 1

It is certified that error appears in the above-identified patent and that said Letters Patent is hereby corrected as shown below:

In the Claims

Column 16
Line 36; Claim 4, replace: "of the of the" with --of the--

Column 18
Line 1; Claim 12, replace: "of the of the" with --of the--

Signed and Sealed this
Ninth Day of June, 2020

Andrei Iancu
*Director of the United States Patent and Trademark Office*